United States Patent
Kurupati (10) Patent No.: US 9,639,699 B1
(45) Date of Patent: May 2, 2017

(54) DETECTING NON-HUMAN USERS ON COMPUTER SYSTEMS

(71) Applicant: CYBERFEND, INC., Fremont, CA (US)

(72) Inventor: Sreenath Kurupati, Sunnyvale, CA (US)

(73) Assignee: Cyberfend, Inc., Santa Clara, CA (US)

( * ) Notice: Subject to any disclaimer, the term of this patent is extended or adjusted under 35 U.S.C. 154(b) by 0 days.

(21) Appl. No.: 14/802,531

(22) Filed: Jul. 17, 2015

Related U.S. Application Data (60) Provisional application No. 62/026,570, filed on Jul. 18, 2014.

(51) Int. Cl.
*G06F 21/56* (2013.01)

(52) U.S. Cl.
CPC ...... *G06F 21/566* (2013.01); *G06F 2221/034* (2013.01); *G06F 2221/2133* (2013.01)

(58) Field of Classification Search
CPC ........... G06F 21/566; G06F 2221/2133; G06F 2221/034
See application file for complete search history.

(56) References Cited

U.S. PATENT DOCUMENTS

| | | | | |
|---|---|---|---|---|
| 8,353,017 B2* | 1/2013 | Cerruti | ............... | G06F 21/31 726/1 |
| 8,949,126 B2* | 2/2015 | Gross | ............... | G10L 15/22 704/244 |
| 8,997,226 B1* | 3/2015 | Call | ............... | G06F 21/552 709/224 |
| 2003/0046072 A1 | 3/2003 | Ramaswamy et al. | | |
| 2009/0106827 A1* | 4/2009 | Cerruti | ............... | G06F 21/31 726/7 |
| 2010/0332841 A1* | 12/2010 | Watts | ............... | G06F 21/43 713/182 |
| 2011/0202762 A1* | 8/2011 | Hadad | ............... | G06Q 20/388 713/164 |
| 2012/0246737 A1* | 9/2012 | Paxton | ............... | G06F 21/316 726/27 |
| 2012/0291108 A1* | 11/2012 | Talamo | ............... | H04L 9/3273 726/6 |
| 2013/0055372 A1* | 2/2013 | Chao | ............... | G06F 21/31 726/7 |
| 2013/0291107 A1* | 10/2013 | Marck | ............... | G06F 21/316 726/23 |
| 2014/0317726 A1* | 10/2014 | Turgeman | ............... | G06F 21/32 726/19 |
| 2014/0317744 A1* | 10/2014 | Turgeman | ............... | H04L 63/1408 726/23 |

(Continued)

*Primary Examiner* — Michael Pyzocha (57) ABSTRACT

A method including collecting, by a processing device, raw data regarding an input to fill a form field. The method further includes converting, by the processing device, the raw data to test data, wherein the test represents behavioral characteristics of the entry of the input. The method further includes identifying a human characteristic model corresponding to the behavior characteristics of the entry of the input. The method further includes generating a predictor from a comparison of the test data against the corresponding human characteristic model. The predictor includes a score indicating a probability that the input originated from a human user or from a malicious code imitating the human user.

13 Claims, 11 Drawing Sheets

(56) References Cited

U.S. PATENT DOCUMENTS

2015/0143494 A1   5/2015   Lee et al.
2015/0156084 A1 * 6/2015   Kaminsky ............... H04L 43/04
                                                 709/224

* cited by examiner

DETECTING NON-HUMAN USERS ON COMPUTER SYSTEMS

RELATED APPLICATIONS

This application claims the benefit of U.S. Provisional Application No. 62/026,570, filed Jul. 18, 2014 and entitled "Method and Apparatus to Detect Non-human Users on Computer Systems," the entirety of which is incorporated herein by reference.

BACKGROUND

Computing devices today include servers, desktops, laptops and mobile devices such as phones and tablets. In typical usage only authorized users are allowed to use the device. However due to various security weaknesses, unauthorized human and machine takeover may occur.

To prevent unauthorized users from using a computing device/service, various authentication mechanisms exist today. However due to various security weaknesses as well as human errors, security threats can exist in the system. One such weakness is the presence of malicious programs/bots on user devices. To detect these malicious programs typically anti-virus/malware detection SW is employed. These detection programs have various limitations. Furthermore users may not employ the best anti-virus/malware detection SW posing larger threats.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Methods and systems for malicious non-human user detection on computing devices are described. The embodiments described herein detect malicious non-human users (aka malicious code, malicious bots, or the like) on computer systems. As described above, to prevent unauthorized users from using a computing device or service, various authentication mechanisms exist today. However due to various security weaknesses as well as human errors, security threats can exist in the system. One such weakness is the presence of malicious programs/bots on user devices. To detect these malicious programs, typically conventional anti-virus/malware detection software products are employed. These conventional detection programs have various limitations. Furthermore users may not employ the best anti-virus/malware detection software posing larger threats. As used herein, the term "user" may refer to human users or non-human users. These non-human users can be malicious machine programs, malicious scripts, or the like. Unlike anti-virus or malware detection software products that often look for binary signature patterns in malicious code, the present embodiments can analyze the behavior of the user and can distinguish the behavioral differences of a human user vs a non-human user. Additionally the present embodiments can leverage the differences in cognitive capabilities of the human user vs non-human user. There are several areas where these embodiments can apply. These areas include, but are not limited to, brute force attacks, bot/botnet attacks, man in the middle attacks and man in the browser attacks. These attacks can occur on both mobile and non-mobile devices. In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

The embodiments described herein may be implemented in processing logic that may comprise hardware (circuitry, dedicated logic, etc.), software (such as is run on a general purpose computing system or a dedicated machine), firmware (embedded software), or any combination thereof. Embodiments of the invention may run on various computing devices.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1:
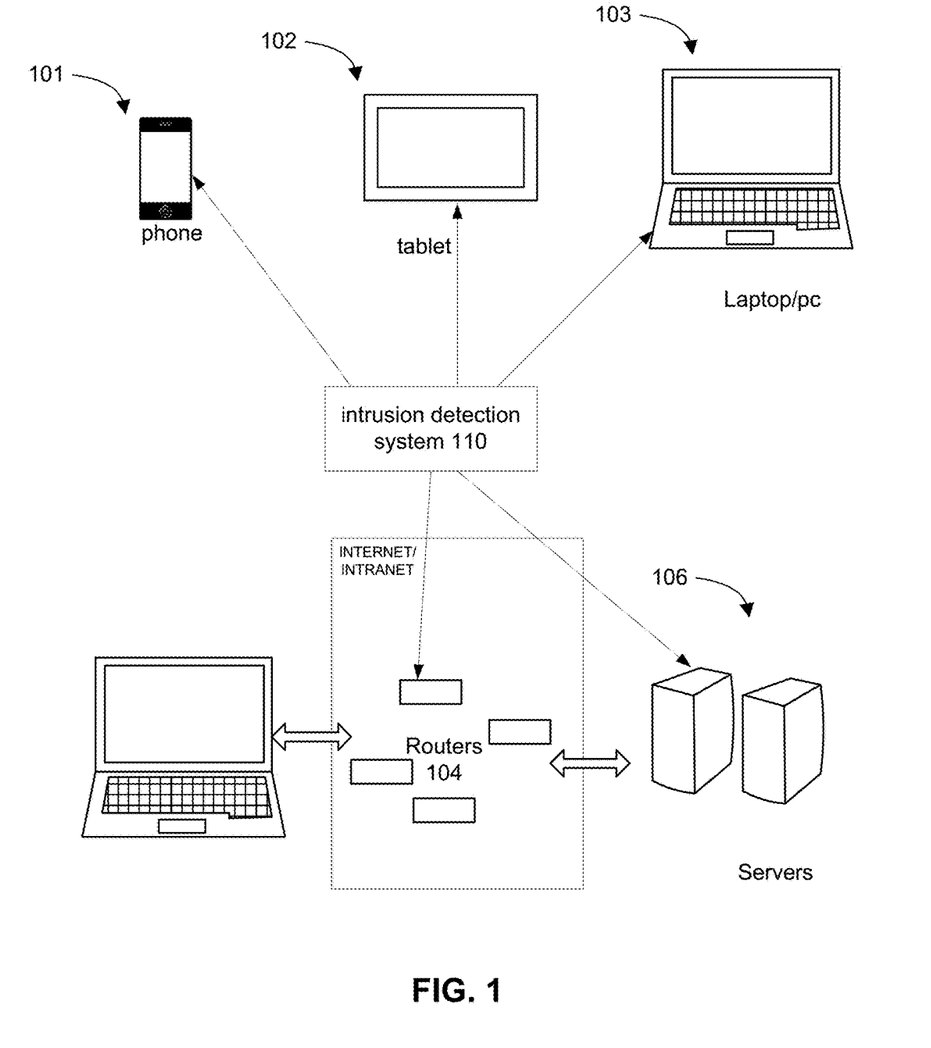
FIG. 1 illustrates some possible devices where the present embodiments described herein can be used.

FIG. 1 illustrates some computing devices where embodiments of a detection system 110 may be used. Note that there are other computing devices (not shown in FIG. 1) where the embodiments can be applied. The devices include smart phones 101, tablets 102, and laptop/pc's 103. In other embodiments, the detection system 110 may be used in other devices, such as routers 104 and servers 106. The routers 104 may be part routers deployed in a local area network, an intranet, or the Internet. Exemplary network architectures may include multiple client computing systems and multiple server computing systems coupled via a data communications network (e.g., public network such as the Internet or private network such as a local area network (LAN)). The network may include the Internet and network connections to the Internet. Alternatively, the detection system 110 may be located on any device in a common LAN, Personal area network (PAN), Campus Area Network (CAN), Metropolitan area network (MAN), Wide area network (WAN), wireless local area network, cellular network, virtual local area network, or the like. The detection system 110 can be implemented in a client device (also referred to just as client). The client may be a client workstation, a server, a computer, a portable electronic device, an entertainment system configured to communicate over a network, such as a set-top box, a digital receiver, a digital television, a mobile phone or other electronic devices. For example, portable electronic devices may include, but are not limited to, cellular phones, portable gaming systems, portable computing devices or the like. The client may have access to the Internet via a firewall, a router or other packet switching devices. The detection system 110 can be implemented in a server computing system, or in both a client computing system and a server computing system. The server computing system may be a network appliance, a gateway, a personal computer, a desktop computer, a workstation, etc. Alternatively, the functionality of the detection system 110 can be distributed over two or more machines. Alternatively, other configurations are possible as would be appreciated by one of ordinary skill in the art having the benefit of this disclosure.

Figure 2:
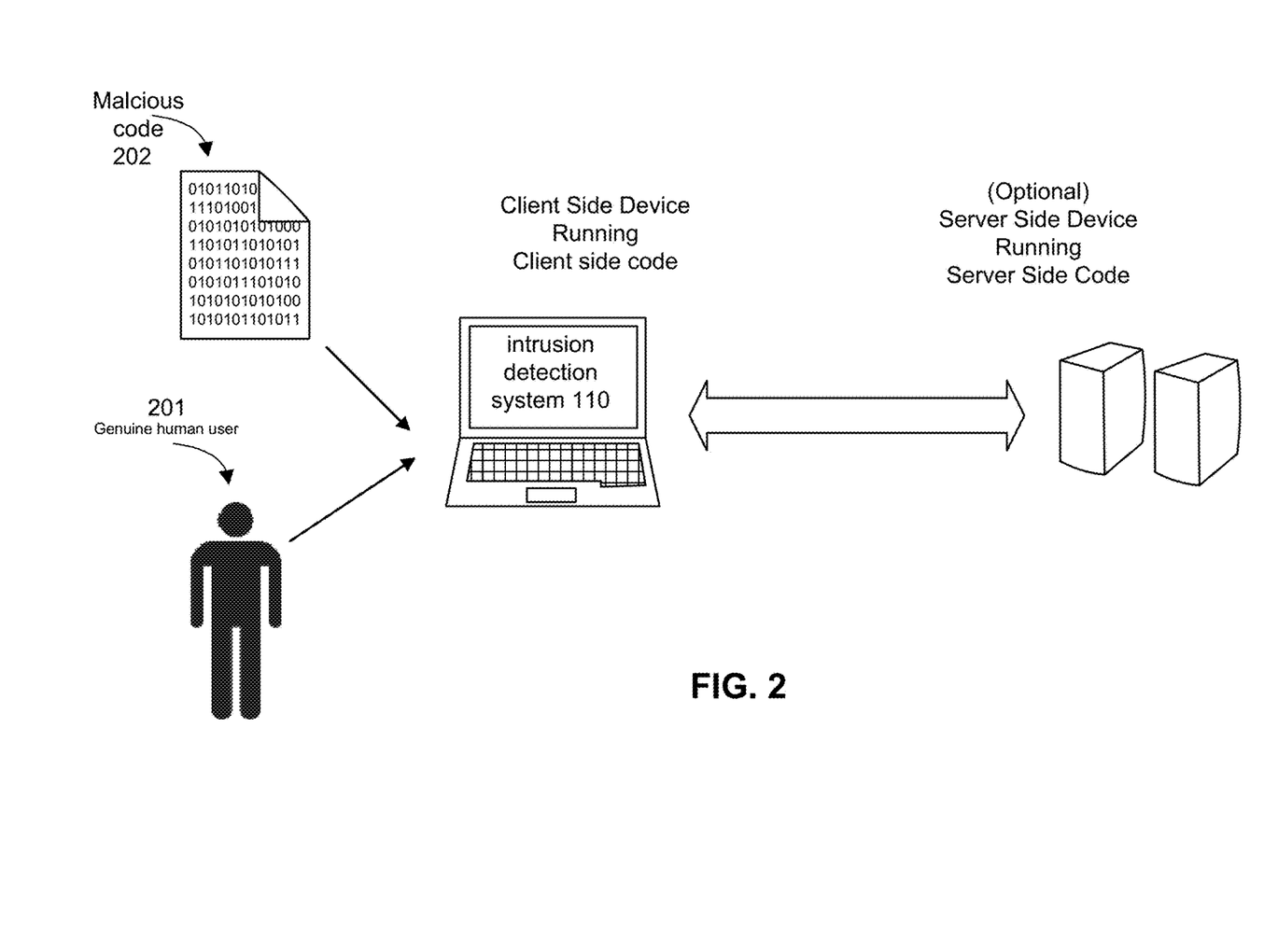
FIG. 2 illustrates a typical end-to-end scenario where the present embodiments can be used.

FIG. 2 illustrates a typical end-to-end scenario where the present embodiments can be used. A genuine human user 201 typically uses a computing system. The computing system itself maybe a single system or may be split into a client side device and a server side device. Alternatively, other configurations may be possible. It should be noted that the client/server device combinations can include any of the embodiments depicted in FIG. 1, including mobile devices. The computing system may be running an application program. The application program typically may include client side code running on the client side device and server side code running on the server side device. Instead of a genuine human user 201, the computing system may get compromised or infected by malicious code 202 that acts as a user (referred to herein as a "malicious non-human user"). The present embodiments of detection system 110 (client-side code and/or server-side code) is aimed at detecting the malicious code 202. Other embodiments include a configuration where the malicious program is in a browser executing on the client device, as an intermediate point between the genuine user and the computer system (often termed as man in the middle or man in the browser). In the case of man in the middle/man in the browser situations, the malicious program may use the users access to modify the data maliciously at appropriate intercept points.

Figure 3:
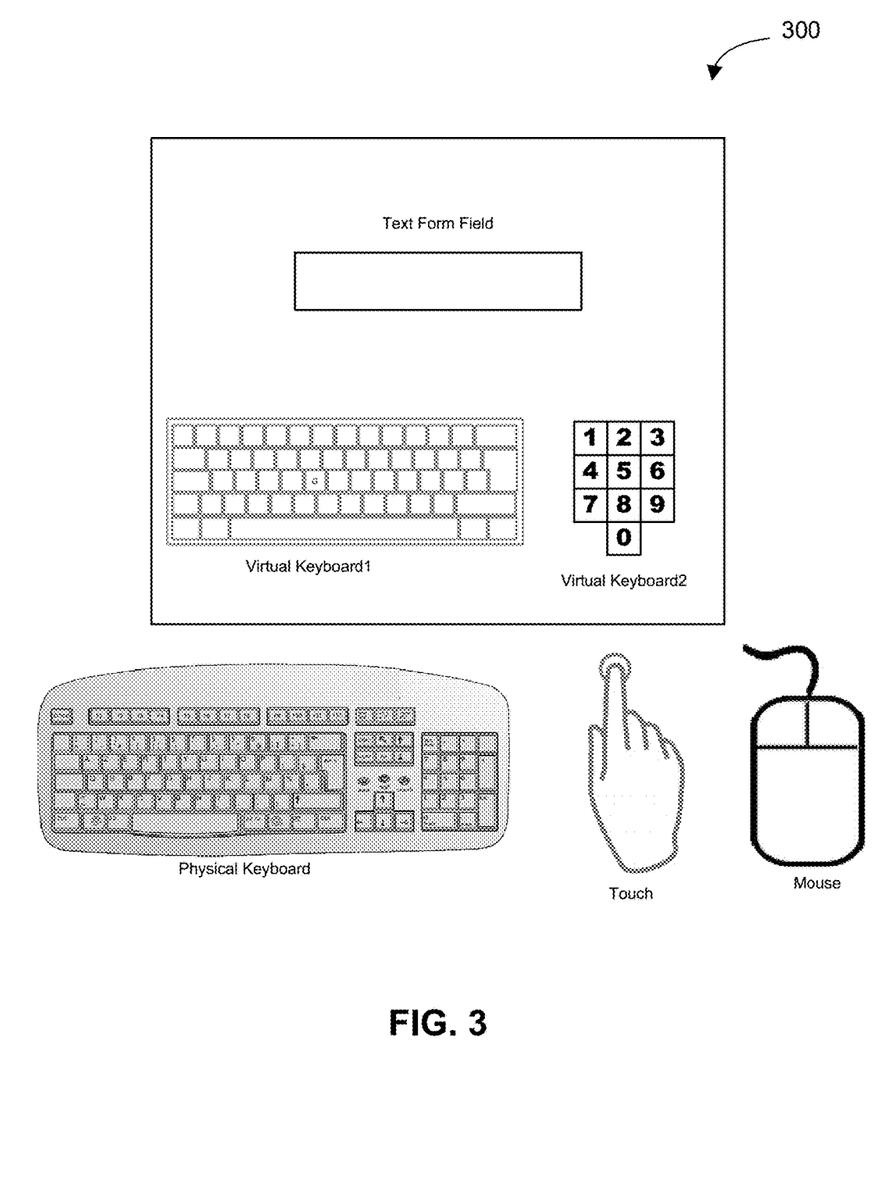
FIG. 3 illustrates various user interface elements as a user is filling a form in a computer application according to one embodiment.

FIG. 3 illustrates various user interface elements 300 as a user is filling a form in a computer application according to one embodiment. These may include a physical keyboard or virtual keyboards. In case of virtual keyboards, various options are possible. FIG. 3 illustrates two examples where a virtual keyboard can be operated typically by touch or mouse events.

Figure 4:
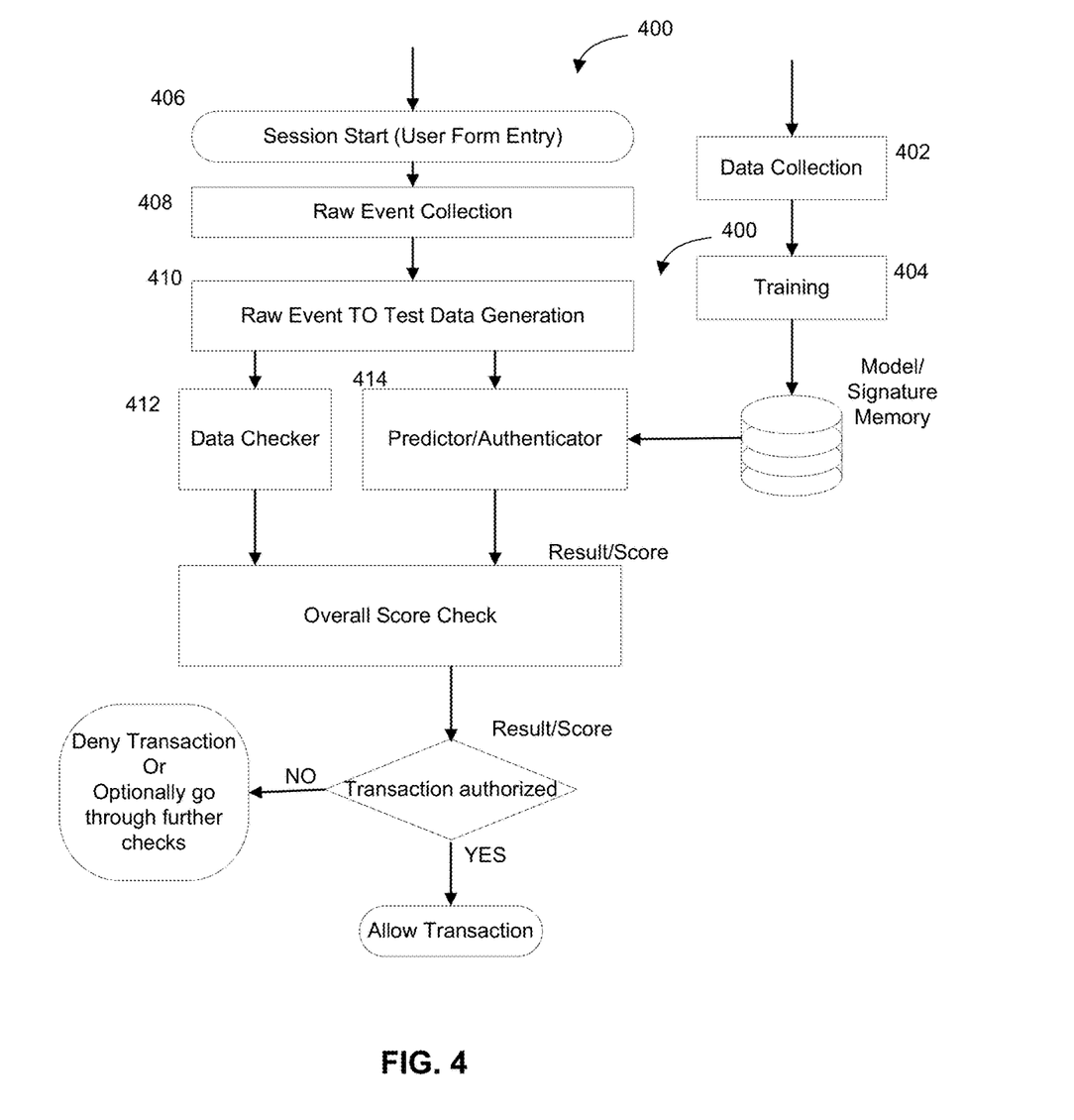
FIG. 4 is a flow diagram of a method of differentiating human users from malicious code according to one embodiment.

FIG. 4 is a flow diagram of a method 400 of differentiating human users from malicious code according to one embodiment. The method 400 is performed by processing logic that may comprise hardware (circuitry, dedicated logic, etc.), software (such as is run on a general purpose computing system or a dedicated machine), firmware (embedded software), or any combination thereof. In one embodiment, the detection system 110 of FIG. 1 or FIG. 2 performs the method 400. Alternatively, other components of a client computing system, server computing system, router, or other network device can perform some or all of the operations of method 400.

Referring to FIG. 4, processing logic performs data collection (block 402). Data collection (402) is done to collect data on behavior characteristics of human (also referred to as positive users) and non-human users (also referred to as negative users). These behaviors characteristics may include keystroke, touch, mouse, accelerometer, gyroscope, and other sensor characteristics, or the like. In the case of keystroke characteristics, these behavior characteristics may include keystroke dwell, press times, inter keystroke delays, and the like. In the case of touch characteristics, these behavior characteristics may include touch duration, touch pressure, touch direction, touch coordinates, timestamps, and the like. In one case, the touch action is motion action, such as a swipe, drag, etc. Touch characteristics may include overall characteristics of the line segment or curve effectively rendered by the touch during the motion action and the speed, acceleration, distance characteristics of that curve, and the like. In the case of mouse characteristics, these behavior characteristics may include mouse events (e.g., mouse movements (or other cursor movements), single click, double click, drag event, etc.), the coordinate of the mouse position, timestamp, and the like. In the case of a mouse move event (simple move, drag, etc.), the mouse characteristics may include overall characteristics of the line segment or curve effectively rendered by the mouse during the mouse movement as well as the speed, acceleration, distance characteristics of that curve, and the like. Note that data collection may be a real time or offline process and may not be linked temporally with the dataflow on the left (described in more detail below). The collected data is then passed onto a training stage (block 404). Various embodiments of the training technique may include nearest neighbor, Manhattan distance, Euclidean distance, Neural Networks, Fuzzy Logic, K-means, SVM. Different behavioral characteristics may employ training techniques suitable for that particular characteristic. In one embodiment, the output of the training process 404 represents a characteristic model/signature that is stored in the model/signature memory. This model/signature can be used to distinguish genuine human users versus a malicious user (malicious computer program.)

In session start 406, the user attempts to enter data in an application form. Various embodiments of the application form are possible. These include the embodiments described in FIG. 3. They can also include embodiments that will be described in FIGS. 5-8 where user interface (UI) mechanisms may include interesting UI transformations.

From the user form, as the user performs the data entry various raw events 407 are collected. Depending on the particular user device, these events may include the keystroke/touch/mouse/accelerometer/gyrosocope/other sensor characteristics described earlier. These raw events are then transformed into test data. The test data may be used in two places. For example, the test data is passed to a data checker 412 that checks the data validity. This check may be employed as the embodiments described in FIGS. 5,6,7,8 that may include interesting UI transformation that may cause a malicious computer program to enter incorrect data. In a further embodiment, the test data may be passed to the predictor/authenticator stage 414. This stage returns a score, which may be a threat value or a probability score on whether the user is the genuine human user 201 or a malicious code 202. The predictor stage may employ various possible techniques to perform the matching/probability analysis. Various embodiments of the matching/probability analysis technique may include nearest neighbor, Manhattan distance, Euclidean distance, Neural Networks, Fuzzy Logic, K-means, SVM or other statistical/pattern matching/machine learning techniques. The predictor stage 414 uses the training model/signature as the baseline model and checks the test data against that model. The data checker score and the predictor score are passed to the overall score check module that produces an aggregate score. This score is then used to check if the transaction is authorized. If it is authorized, the transaction may proceed. Otherwise the transaction may be denied or further checks may be performed. For example, in one embodiment, a further check may be performed, such as described in the embodiments with respect to FIGS. 9-10.

As described above, apart from standard UI configurations depicted in FIG. 3, the system may include interesting UI transformations that may provide cognitive difficulty for a malicious program. Some UI transformations are described below with respect to FIGS. 5-8. It should be noted that these UI transformations may be included in the operations described above, or may be stand-alone operations in other systems.

Figure 5:
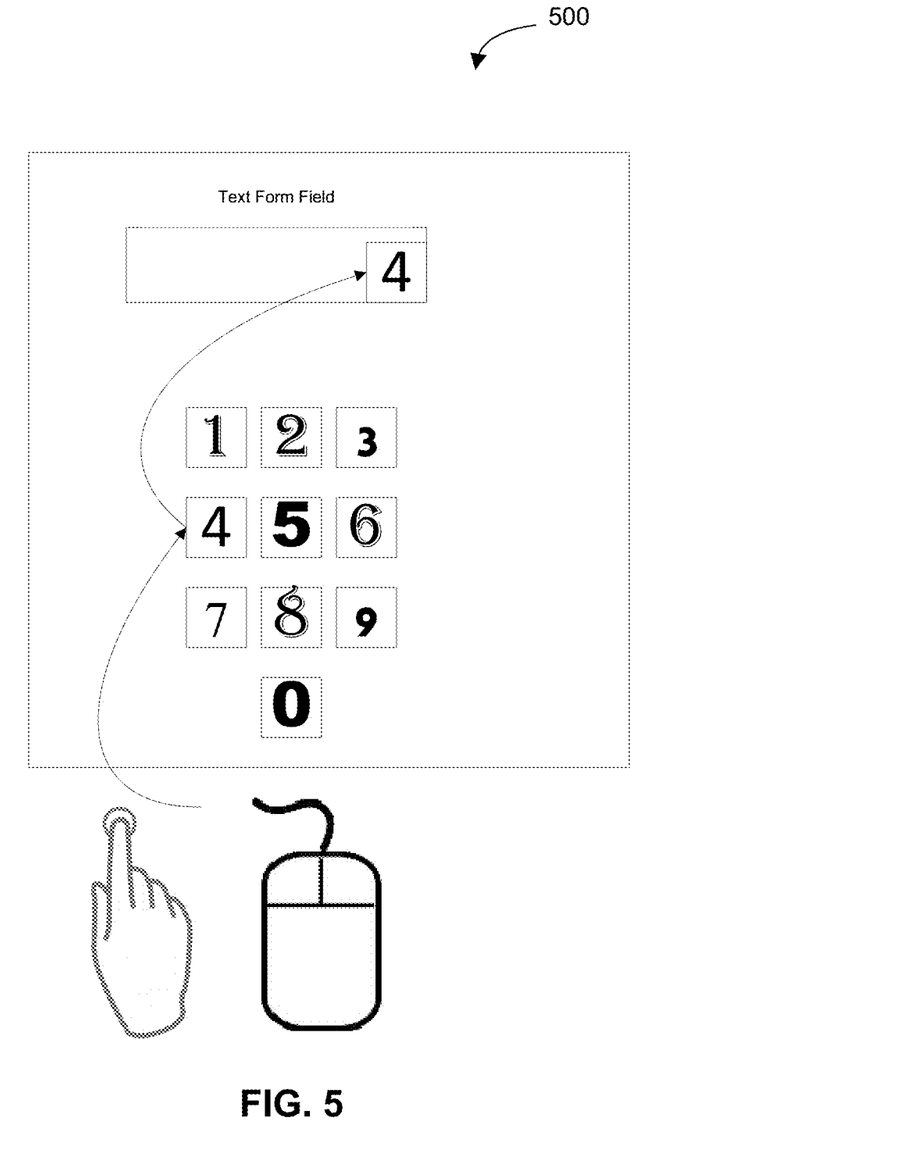
FIG. 5 illustrates a user interface mechanism according to one embodiment.

FIG. 5 illustrates a user interface mechanism 500 according to one embodiment. FIG. 5 illustrates a virtual keyboard where the key characters shown are objects from image files (bitmaps, png, jpeg or various other formats). The user interface mechanism 500 can be included as part of the method 400 of FIG. 4. The images themselves may include image transformations which are not easily recognizable by a computer program but which a human can interpret. A similar concept is employed in captcha technology. However, unlike a typical captcha usage, the detection system described in FIG. 4 embeds these into the user interface control. The virtual keyboard example shown in the FIG. 3 is a virtual pin pad, however other embodiments may include various keyboard configurations including a full ASCII keyboard with controls such as back space, delete, etc. When data is entered into the virtual keyboard, the data appearing on the screen (in the text form field) may be rendered as hidden ("*" chars) or rendered using an image to prevent a malicious program to interpret the characters. The virtual keyboard can be operated by touch or by mouse and the collected characteristics and data can be used in the detection system described in FIG. 4. In one example, a user inputs a request to transfer money from the user's bank account. In entering the request, the user is asked to enter an account number and/or PIN (personal identification number). As the user enters the numbers, the output may be rendered in the text field using image objects identical or similar to those the user has interacted with to enter the numbers. In response, the user may be presented with a confirmation image that may have some visual/cognitive transforms (described in greater detail below) which the user is asked to interpret and solve by entering a corresponding number or series of numbers or other characters. Another example may include an instance in which a user desires to access a protected file. The user may be requested to enter a username and password to gain access. The visual interface presented to the user may include a virtual keyboard which the user may interact with through the use of a mouse, touch input, or another manner. The interface may incorporate one or more character objects. For example, the user may see a distorted letter "A" and be able to recognize cognitively that tapping or otherwise interfacing with the distorted "A" will enter an "A" into the form field. However, a malicious code/program/script may have difficulty reading the interface and the form field. This protects the user and user's information.

Figure 6:
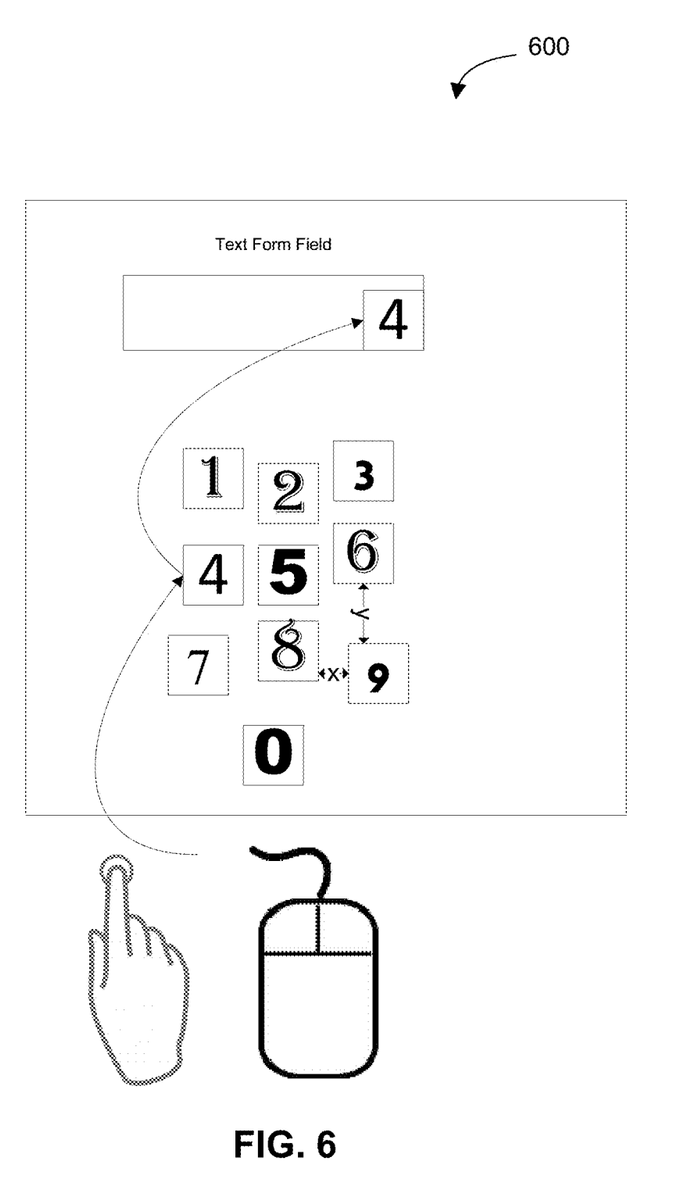
FIG. 6 illustrates a user interface transformation device according to one embodiment.

FIG. 6 is another variant of a UI transformation device 600 according to one embodiment. The UI transformation device 600 can be included as part of the method 400 of FIG. 4. Apart from the properties described in FIG. 5, this spacing between the key images or objects is randomized. This can potentially prevent a malicious program that has been pre-trained with x-y coordinate information from punching the required keys. In some embodiments, the objects may be displaced in one or more directions. The objects may be changed in size as well. In some embodiments, all of the objects may be displaced from a standard position. In another embodiment, less than all of the objects may be displaced. Displacement may be incorporated with a standard character interface or in addition to the replacement of the standard characters with image objects.

Figure 7:
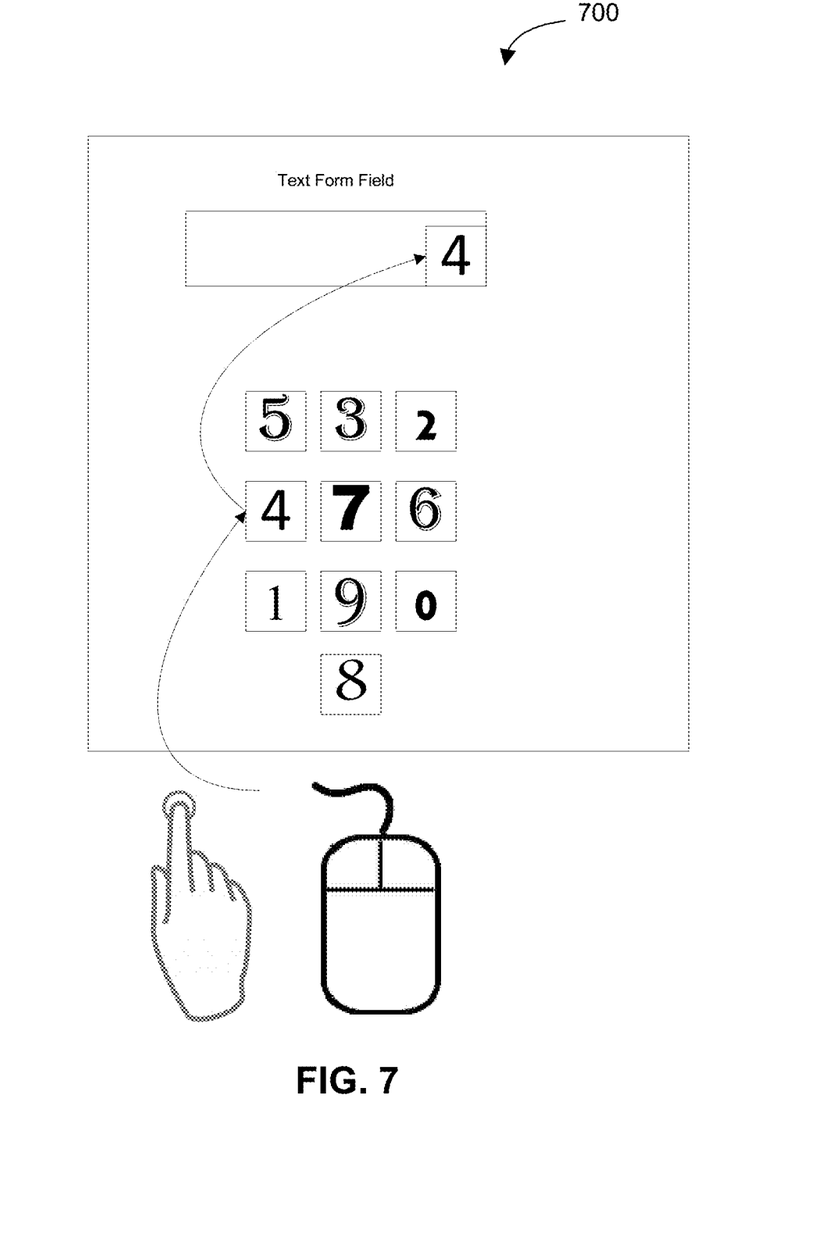
FIG. 7 illustrates a user interface transformation device according to another embodiment.

FIG. 7 is another variant of a UI transformation device 700 according to one embodiment. The UI transformation device 700 can be included as part of the method 400 of FIG. 4. Apart from the properties described in FIG. 5, the sequencing of the keys is randomized. Re-sequencing of the keys or objects may further improve the ability to prevent malicious code from predicting or reading the locations and values of the interface. Some malicious code may be programmed to recognize a 10-key format as a numeric interface and predict where the specific values may be situated. By re-sequencing one or more of the objects, a predicting malicious code would be unable to correctly predict the location of the target value.

Figure 8:
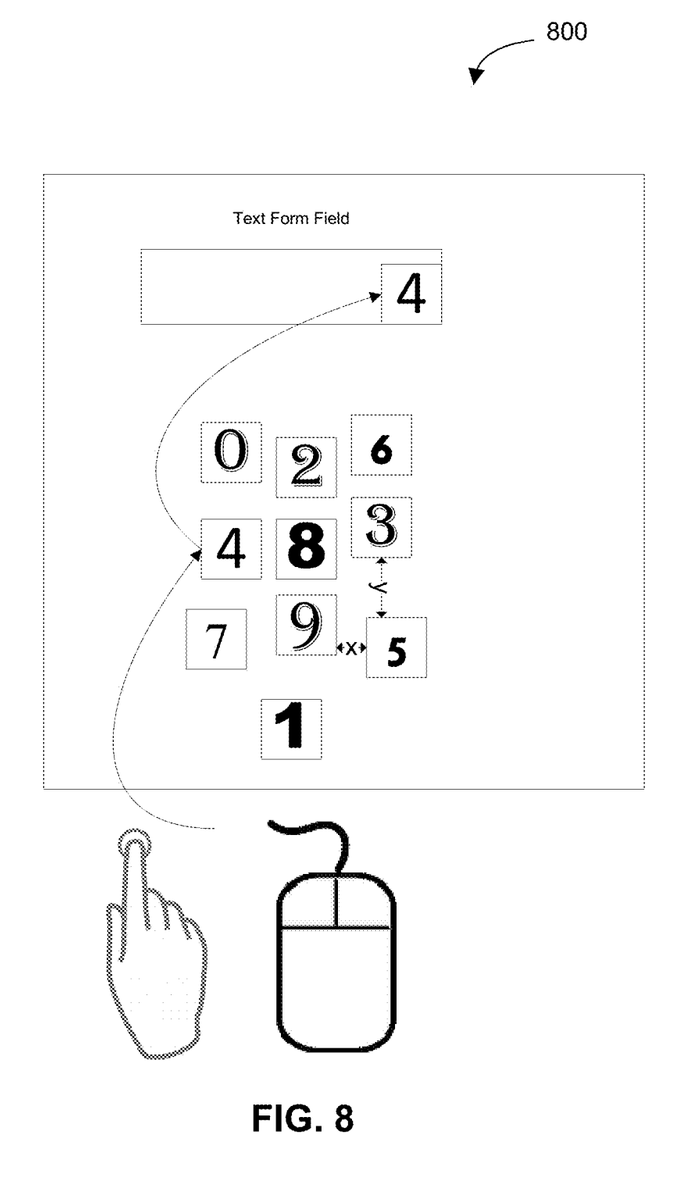
FIG. 8 illustrates a user interface transformation device according to another embodiment.

FIG. 8 is another variant of a UI transformation device 800 according to one embodiment. The UI transformation device 800 can be included as part of the method 400 of FIG. 4. In the UI transformation device 800, both the sequencing and spacing between the keys are randomized. Multiple cognitive transforms may improve resistance to malicious code attacks. As more transforms are applied, a user is still able to interpret and interact with the interface whereas a malicious code will increasingly struggle to enter the intended values or extract values entered by a user.

Figure 9A:
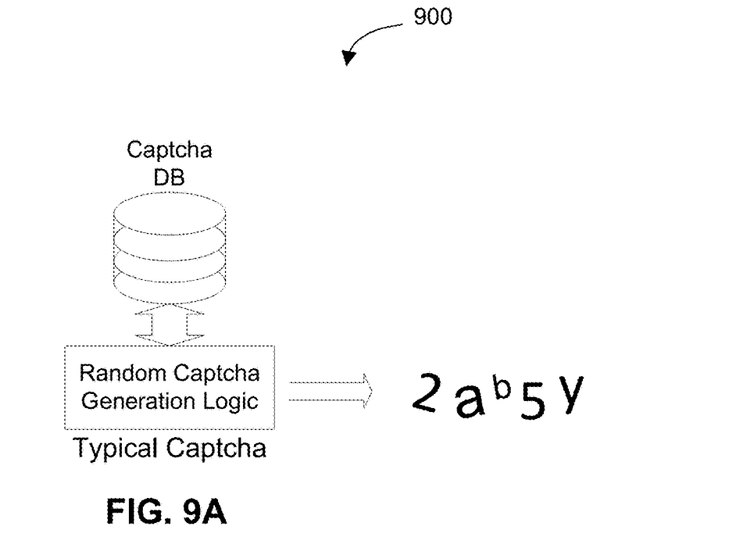
FIG. 9A is a diagram illustrating a typical captcha according to one embodiment.

FIG. 9A is a diagram illustrating a typical captcha 900 according to one embodiment. A typical captcha is an image whose characters are uncorrelated to the context in which they are being used. The present embodiments describes the concept of a seeded captcha.

Figure 9B:
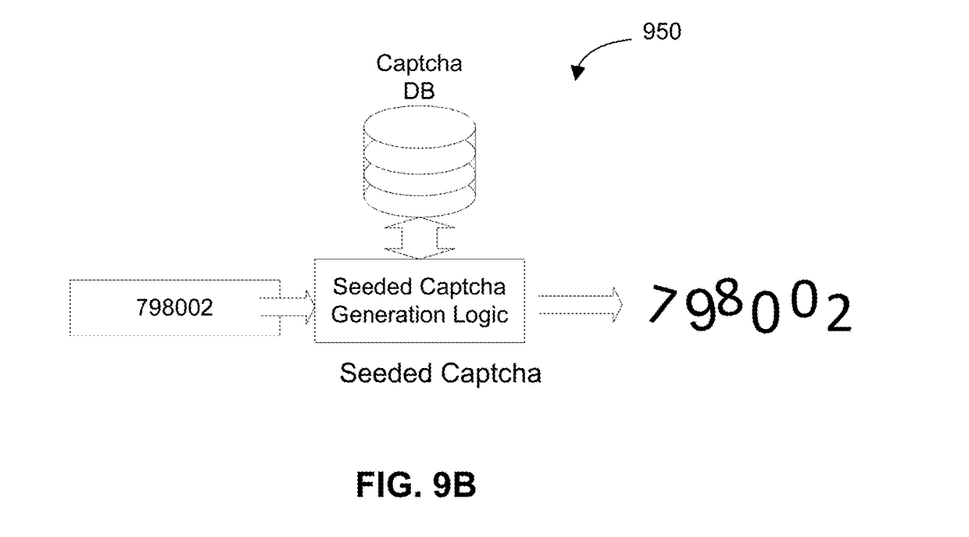
FIG. 9B is a diagram illustrating a seeded captcha according to another embodiment.

FIG. 9B is a diagram illustrating a visual confirmation or seeded captcha 950 according to another embodiment. In the seeded captcha 950, an input string is used as a seed to generate a captcha image or, in general, any other captcha such as an audio or video captcha. In one embodiment, all the characters of the seed may be used. In one embodiment only some of the characters of the seed may be used and the other characters may be picked randomly or may be framed from the context. For instance if a user has entered a bank account number for money transfer, the seed may be the bank account number and the generated captcha may be a large sentence such as "money transfer requested to account xyz". In the illustrated embodiment, the user's account number may include the numbers "146456798." The system may take the last three digits ("798") and incorporate these numbers into the image displayed to the user (distorted "798002"). Alternatively, the visual confirmation may incorporate all of the numbers from the account or may scramble the order of some or all of the numbers of the account.

The incorporation of information which the user may readily recognize or confirm may provide additional certification to the user that the information is correct and uncompromised by a third party. In some embodiments, information may be gathered from multiple aspects of the transaction. For example, the confirmation may include all or a portion of a birthdate of the user, an account or ID number of the transaction, a current or projected date, a quantity of the transaction, and/or other information.

Figure 10:
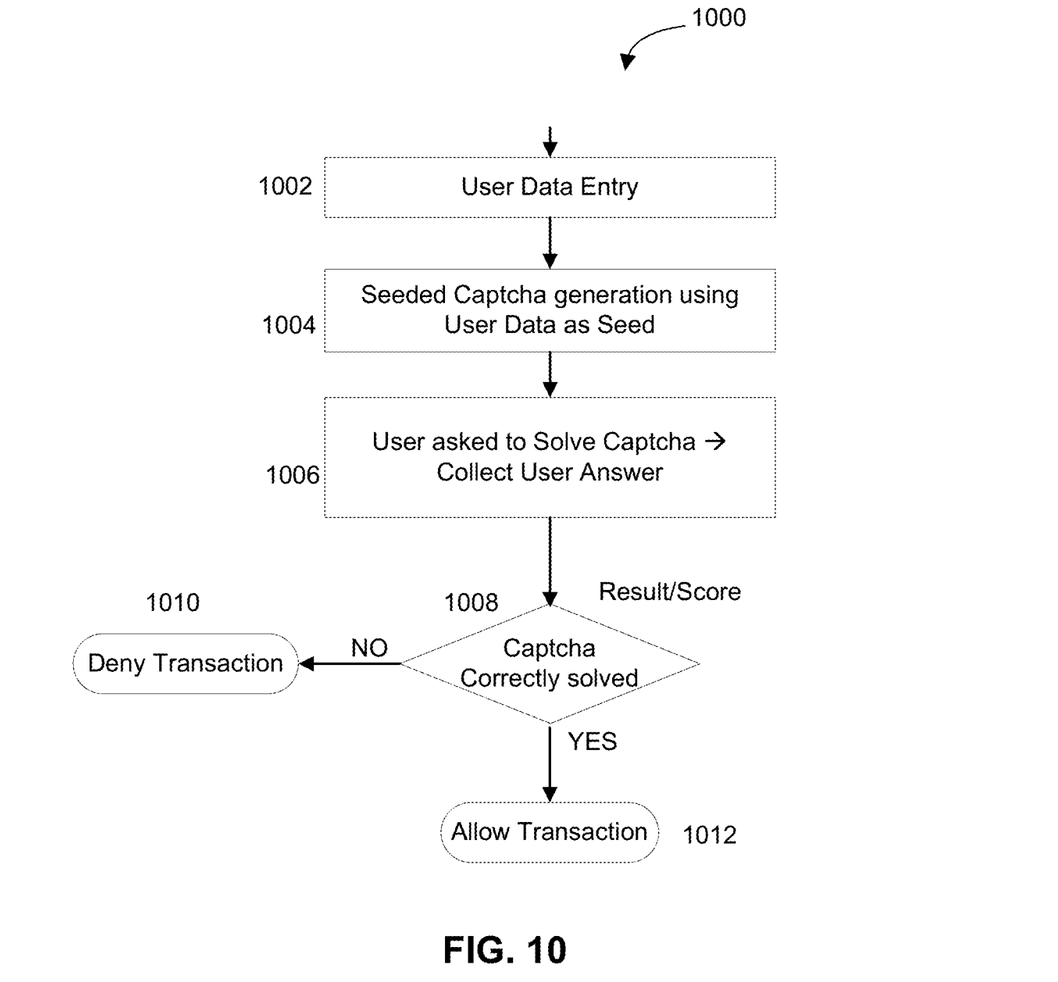
FIG. 10 is a flow diagram of a method of detecting malicious, non-human users using seeded captcha according to another embodiment.

The seeded captcha can be employed to prevent man in the middle/man in the browser attacks, as described herein. As these attacks modify user transactions, the transaction can be presented back to the user in a captcha format which cannot be modified by the malicious program and hence alerting the user to a threat. One such embodiment of a system is illustrated in FIG. 10. This system may be used standalone or as an additional check in the method 400 in FIG. 4 or in other detection methods or systems.

FIG. 10 is a flow diagram of a method 1000 of detecting malicious, non-human users using seeded captcha according to another embodiment. The method 1000 is performed by processing logic that may comprise hardware (circuitry, dedicated logic, etc.), software (such as is run on a general purpose computing system or a dedicated machine), firmware (embedded software), or any combination thereof. In one embodiment, the detection system 110 of FIG. 1 or FIG. 2 performs the method 400. Alternatively, other components of a client computing system, server computing system, router, or other network device can perform some or all of the operations of method 400.

Referring to FIG. 10, processing logic receives a user data entry (block 1002) for a transaction and generates a seeded captcha using user data entry as a seed (block 1004). The processing logic presents a user interface element to allow the user to solve the captcha and collects a response from the user (block 1006). The processing logic determines if the captcha is correctly solved (block 1008). If not solved correctly, the processing logic denies the transaction (block 1010). If solved correctly, the processing logic allows the transaction (block 1012), and the method 1000 ends. Alternatively, the processing logic may perform additional operations in connection with detecting the malicious, non-human users as described herein.

Figure 11:
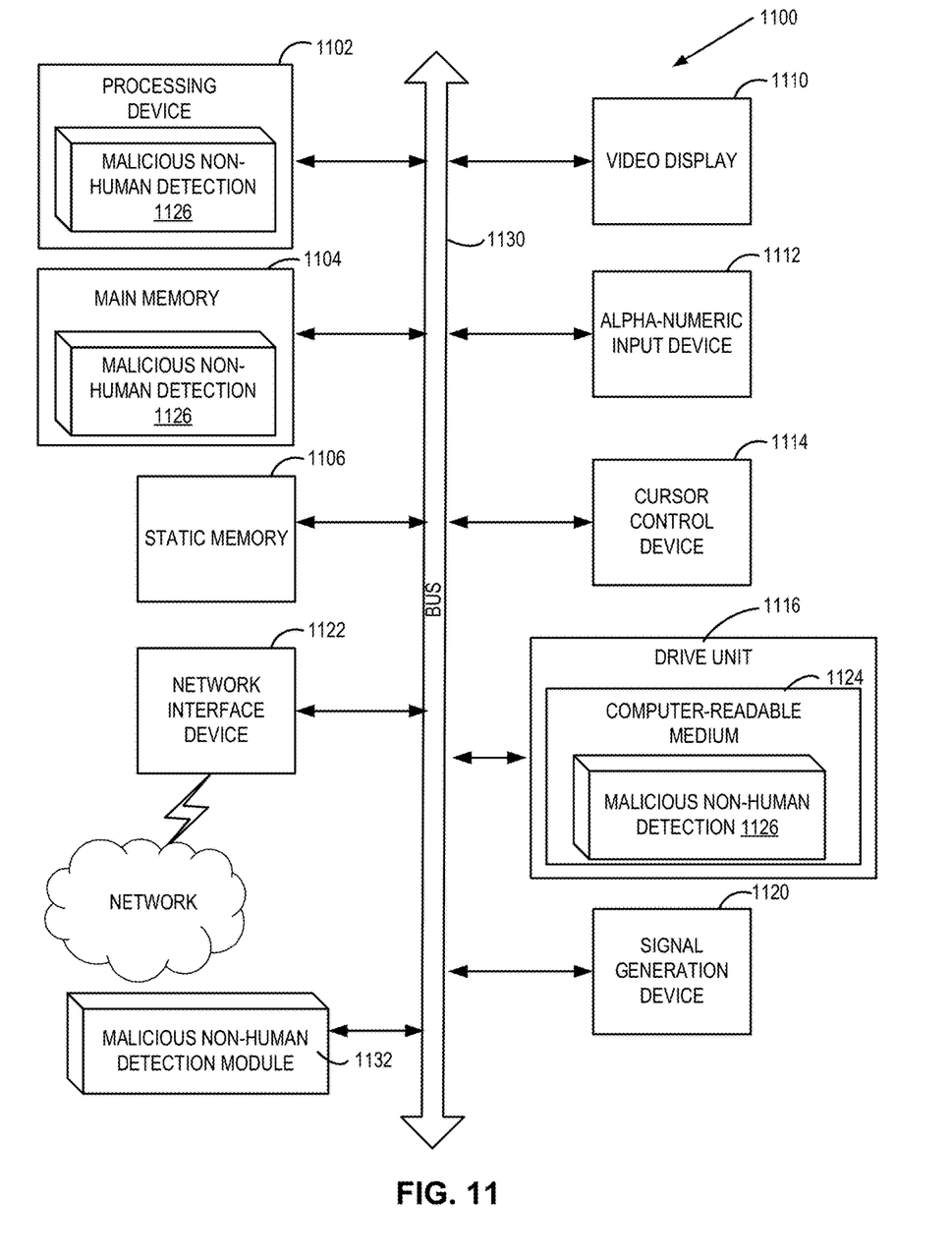
FIG. 11 illustrates a diagrammatic representation of a machine in the exemplary form of a computing system for malicious non-human user detection.

FIG. 11 illustrates a diagrammatic representation of a machine in the exemplary form of a computing system 1100 for malicious non-human user detection. Within the computing system 1100 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for malicious non-human user detection, such as the methods 300 and 1000 described above. The computing system 1100 represents various components that may be implemented in the devices described herein.

The exemplary computing system 1100 includes a processing device 1102, a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a data storage device 1116, each of which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 is configured to execute the processing logic (e.g., malicious non-human user detection 1126) for performing the operations and steps discussed herein.

The computing system 1100 may further include a network interface device 1122. The computing system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1116 may include a computer-readable storage medium 1124 on which is stored one or more sets of instructions (e.g., malicious non-human user detection 1126) embodying any one or more of the methodologies or functions described herein. The malicious non-human user detection 1126 may also reside, completely or at least partially, within the main memory 1104 and/or within the processing device 1102 during execution thereof by the computing system 1100, the main memory 1104 and the processing device 1102 also constituting computer-readable storage media. The malicious non-human user detection 1126 may further be transmitted or received over a network via the network interface device 1122.

While the computer-readable storage medium 1124 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The malicious non-human user detection module 1132, components, and other features described herein (for example in relation to FIGS. 1-3 and 5-9B) can be implemented as discrete hardware components or integrated in the functionality of hardware components such as ASICS, FPGAs, DSPs, or similar devices. The malicious non-human user detection module 1132 may implement operations of malicious non-human user detection as described herein with respect to FIG. 3 and FIG. 10. In addition, the malicious non-human user detection module 1132 can be implemented as firmware or functional circuitry within hardware devices. Further, the malicious non-human user detection module 1132 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   receiving, by a processing device of a server device, a request for a transaction by a client device;
   in response to the request, causing, by the processing device, a graphical user interface to display on the client device, the graphical user interface comprising a form field and a user interface control mechanism, wherein the graphical user interface comprise a plurality of individual images embedded within the user interface control mechanism, each of the plurality of individual images comprising a cognitive transform of a character for input selection by a user, wherein the cognitive transform is visually interpretable by a human user and at least partially prohibitive to interpretation by malicious code;
   receiving, by the processing device, input comprising a selection of characters via the user interface control mechanism;
   collecting, by processing device, data relating to entry of the input at the user interface control mechanism, wherein the data represents behavioral characteristics of the entry of the input;
   generating a score from a comparison of the data against a human characteristic model corresponding to expected behavior characteristics of the entry at the user interface control mechanism, wherein the score indicates a probability that the input originated from the human user or from the malicious code imitating the human user;
   determining, by the processing device, whether the input is valid;
   generating, by the processing device, a seeded captcha image using at least a portion of the input as a seed, wherein the seeded captcha image comprises a second cognitive transform that is visually interpretable by the human user and at least partially prohibitive to interpretation by the malicious code;
   causing, by the processing device, the graphical user interface to display the seeded captcha image for a visual confirmation by the user;
   collecting, by the processing device, a response to the seeded captcha image by the user via the graphical user interface;
   determining, by the processing device, whether the response correctly solves the seeded captcha image;
   determining, by the processing device, whether the user is the human user when the response correctly solves the seeded captcha image, the input is valid, and the score is greater than a threshold; and
   permitting, by the processing device, the transaction when the user is determined to be the human user.

2. The method of claim 1, wherein the human characteristic model comprises aspects of a human input different from aspects of a malicious code input.

3. The method of claim 1, wherein the input to fill the form field comprises a user input at a physical user interface device, the physical user interface device comprising one or more of a list of sensor devices to collect the data, the list comprising:
   a keyboard;
   a mouse;
   a touch interface;
   an accelerometer; and
   a gyroscope.

4. The method of claim 1, wherein the input to fill the form field comprises a user input at a virtual user interface device.

5. The method of claim 1, wherein the plurality of individual images is arranged in the user interface control mechanism with a pattern in which positions of the plurality of individual images, spacing between the plurality of individual images, or both is randomized.

6. The method of claim 1, wherein the plurality of individual images is arranged in the user interface control mechanism with a pattern in which size of each of the plurality of individual images is randomized.

7. The method of claim 1, wherein the plurality of individual images is arranged in the user interface control mechanism with a first pattern in which positions of the plurality of individual images, a size of each of the plurality of individual images, or both is randomized, and wherein the method further comprises:
- receiving, by the processing device, a second request for a second transaction; and
- in response to the second request, causing, by the processing device, the graphical user interface to display the plurality of individual images embedded within the user interface control mechanism in a second pattern in which positions of the plurality of individual images, a size of each of the plurality of individual images, or both is different from the first pattern.

8. The method of claim 1, further comprising causing, by the processing device, the graphical user interface to hide the selection of characters in the form field or display the corresponding one of the plurality of individual images selected in the form field.

9. A non-transitory computer readable storage medium including instructions that, when executed by a computing system, cause the computing system to perform operations comprising:
- generating, by a processing device, a virtual user interface to facilitate a user interaction at the virtual user interface in response to a user request for a transaction, wherein the virtual user interface comprises a plurality of individual images embedded within a user interface control mechanism, each of the plurality of individual images comprising a cognitive transform to render the virtual user interface visually interpretable by a human user and at least partially prohibitive to interpretation by malicious code;
- collecting, by the processing device, an output value from the virtual user interface based on a user interaction with the virtual user interface;
- collecting, by the processing device, data regarding the user interaction at the virtual user interface, wherein the data represents behavior characteristics of the user interaction;
- generating a prediction score from a comparison of the data against a characteristic model corresponding to expected behavior characteristics of the user interaction at the user interface control mechanism to differentiate the human user from the malicious code imitating the human user; and
- analyzing, by the processing device, the output values from the virtual user interface for correctness;
- generating, by the processing device, a seeded captcha image using at least a portion of the output value as a seed;
- generating, by the processing device, a graphical user interface to facilitate a second user interaction at the graphical user interface, the graphical user interface to display seeded captcha image for a visual confirmation;
- collecting, by the processing device, a response to the seeded captcha image by the second user interaction at the graphical user interface;
- determining, by the processing device, whether the response correctly solves the seeded captcha image;
- determining, by the processing device, whether the user request is from the human user when the response correctly solves the seeded captcha image, the output value is correct, and the score is greater than a threshold; and
- permitting, by the processing device, the transaction when the user is determined to be from the human user.

10. The non-transitory computer readable storage medium of claim 9, wherein the cognitive transform comprises a substitution of at least one image object into the virtual user interface in place of a corresponding character object within the virtual user interface.

11. The non-transitory computer readable storage medium of claim 10, wherein a copy of the at least one image object is input into a form field in response to detection of the user interaction at the at least one image object in the virtual user interface.

12. The non-transitory computer readable storage medium of claim 9, wherein the cognitive transform comprises a displacement of a first object within the virtual user interface relative to second object of the virtual user interface.

13. The non-transitory computer readable storage medium of claim 9, wherein the cognitive transform comprises a re-sequencing of one or more objects within the virtual user interface.

* * * * *